(12) United States Patent　　(10) Patent No.:　US 12,650,748 B2
Nishimoto et al.　　(45) Date of Patent:　Jun. 9, 2026

(54) DISPLAY DEVICE

(71) Applicant: Japan Display Inc., Tokyo (JP)

(72) Inventors: Takuya Nishimoto, Tokyo (JP); Koji Yoshida, Tokyo (JP); Hiroshi Yamaguchi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 19/001,654

(22) Filed: Dec. 26, 2024

(65) Prior Publication Data

US 2025/0216976 A1　　Jul. 3, 2025

(30) Foreign Application Priority Data

Dec. 27, 2023　(JP) ................................. 2023-221490

(51) Int. Cl.
*G06F 3/041*　　(2006.01)
*G06F 3/044*　　(2006.01)
*G09G 3/00*　　(2006.01)
*G09G 3/36*　　(2006.01)

(52) U.S. Cl.
CPC ......... *G06F 3/04166* (2019.05); *G09G 3/001* (2013.01); *G06F 3/044* (2013.01); *G06F 2203/04108* (2013.01); *G09G 3/3611* (2013.01); *G09G 2354/00* (2013.01)

(58) Field of Classification Search
CPC .................. G06F 3/04166; G06F 3/044; G06F 2203/04108; G06F 3/0446; G06F 3/0416; G06F 3/14; G09G 3/001; G09G 3/3611; G09G 2354/00
See application file for complete search history.

(56) References Cited

U.S. PATENT DOCUMENTS

| | | | | |
|---|---|---|---|---|
| 2006/0028453 A1* | 2/2006 | Kawabe | ................ | G06F 3/0488 345/173 |
| 2008/0192024 A1* | 8/2008 | Mita | ........................ | G06F 3/044 345/173 |
| 2010/0073306 A1* | 3/2010 | Hickerson | .............. | B60K 35/22 345/173 |
| 2013/0044080 A1* | 2/2013 | Chiang | .................. | B60K 35/10 345/173 |
| 2020/0174596 A1* | 6/2020 | Cohen | ...................... | G06F 3/044 |
| 2021/0026470 A1* | 1/2021 | Perdices-Gonzalez | ...................... G06F 3/044 |
| 2025/0035784 A1* | 1/2025 | Ichikawa | .............. | G06F 3/0421 |

FOREIGN PATENT DOCUMENTS

JP　　2005-078092 A　　3/2005

* cited by examiner

*Primary Examiner* — Hong Zhou
(74) *Attorney, Agent, or Firm* — XSENSUS LLP

(57)　　　　ABSTRACT

According to an aspect, a display device includes: a display panel including a display region capable of simultaneously displaying a first screen and a second screen, the first screen being visually recognized from a first viewpoint, the second screen being visually recognized from a second viewpoint different from the first viewpoint; a detection sensor including a detection region overlapping the display region; and a control circuit having a first detection function to detect a physical object that is in proximity to the display panel and a second detection function to detect a touch on a graphical object displayed on an operation target screen that is one of the first and second screens. The control circuit determines the operation target screen based on a movement amount of a coordinate on the detection region acquired by the first detection function.

3 Claims, 14 Drawing Sheets

DA                31    PDA1                                                    3

Y
→X

FIG.7A
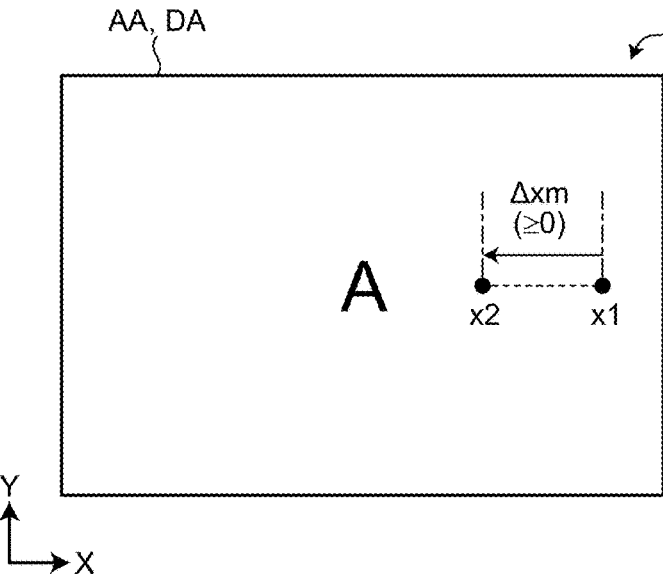
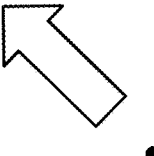
FIG.7B
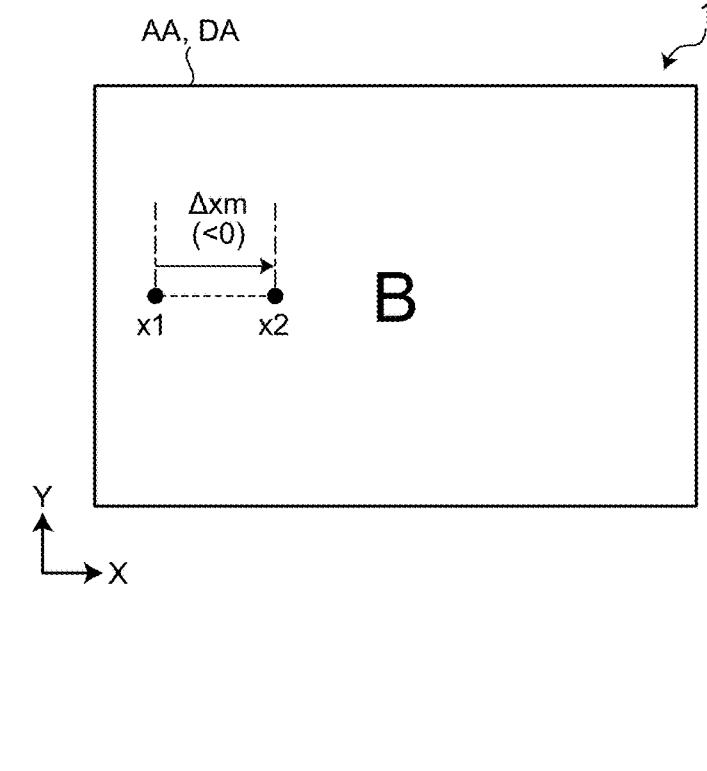
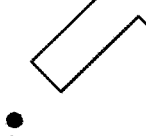

FIG.11A
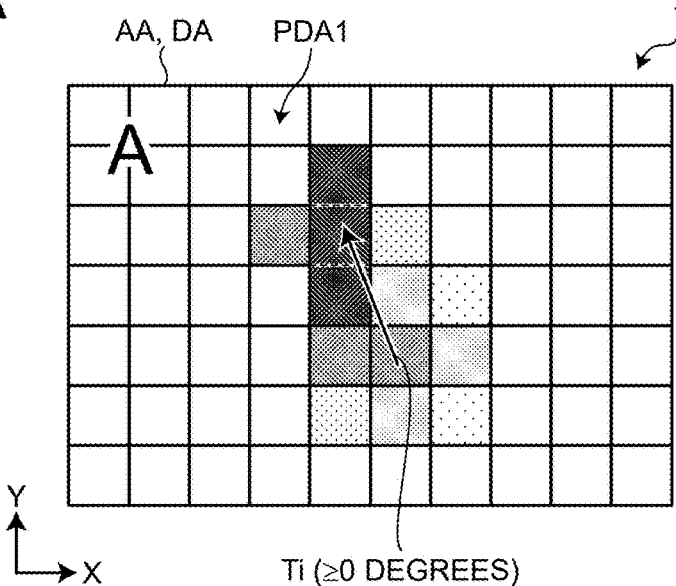
AA, DA    PDA1    1
A
Y
→X
Ti (≥0 DEGREES)
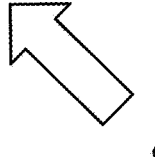
● b
● a
FIG.11B
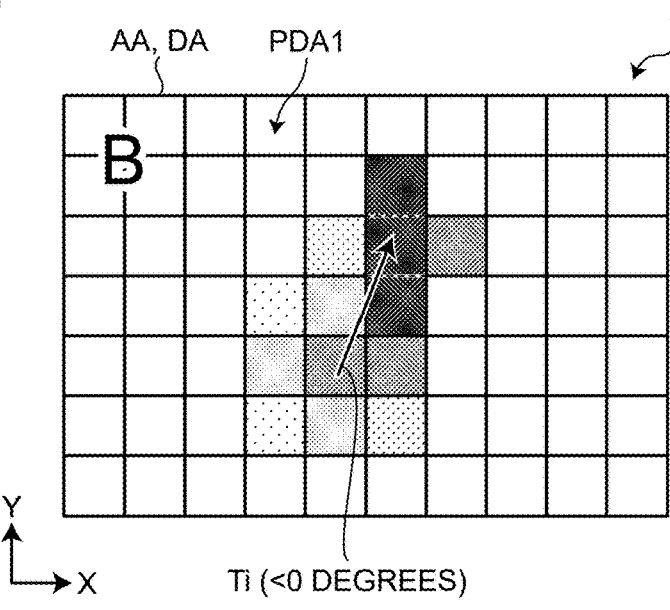
AA, DA    PDA1    1
B
Y
→X
Ti (<0 DEGREES)
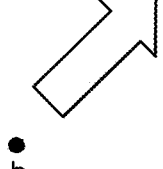
● b
● a

FIG.12

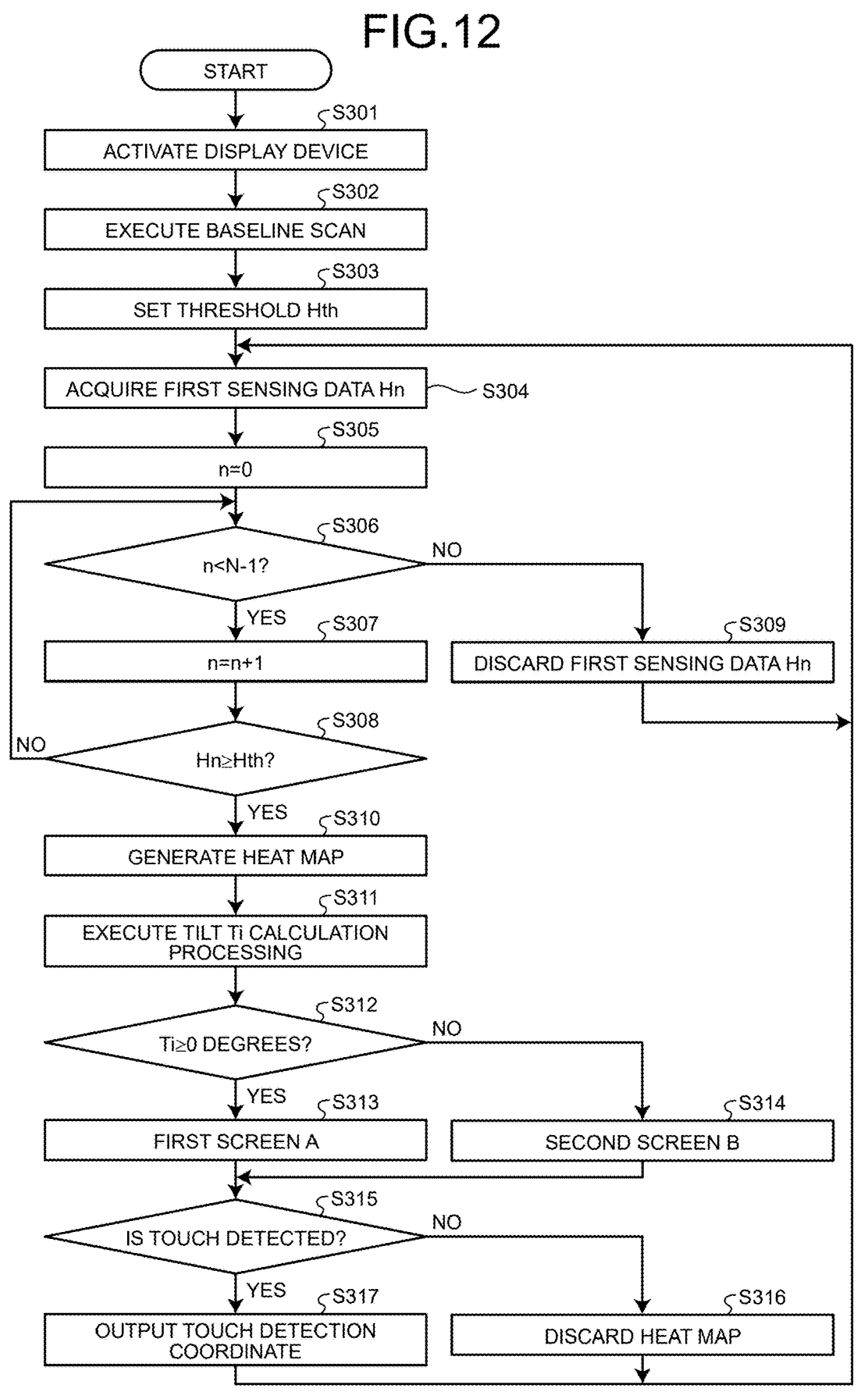

START

S301
ACTIVATE DISPLAY DEVICE

S302
EXECUTE BASELINE SCAN

S303
SET THRESHOLD Hth

S304
ACQUIRE FIRST SENSING DATA Hn

S305
n=0

S306
n<N-1?

NO → S309
DISCARD FIRST SENSING DATA Hn

YES → S307
n=n+1

S308
Hn≥Hth?

NO

YES → S310
GENERATE HEAT MAP

S311
EXECUTE TILT Ti CALCULATION PROCESSING

S312
Ti≥0 DEGREES?

NO → S314
SECOND SCREEN B

YES → S313
FIRST SCREEN A

S315
IS TOUCH DETECTED?

NO → S316
DISCARD HEAT MAP

YES → S317
OUTPUT TOUCH DETECTION COORDINATE

FIG.13A
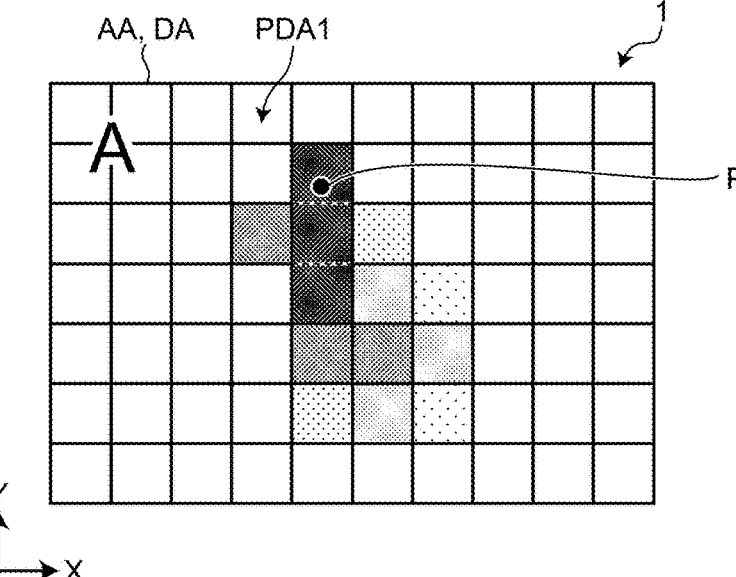
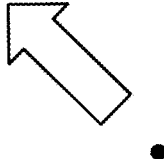
FIG.13B
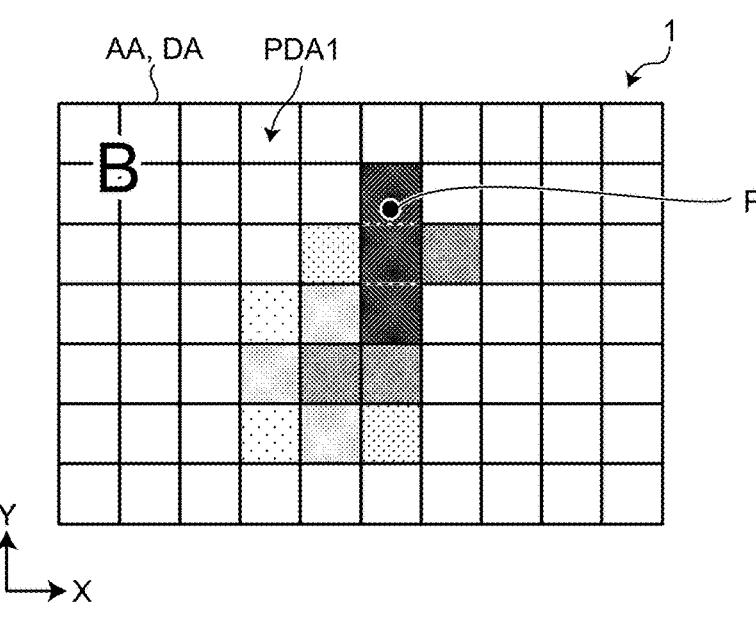
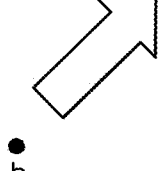

DISPLAY DEVICE

CROSS-REFERENCE TO RELATED APPLICATION

This application claims the benefit of priority from Japanese Patent Application No. 2023-221490 filed on Dec. 27, 2023, the entire contents of which are incorporated herein by reference.

BACKGROUND

1. Technical Field

What is disclosed herein relates to a display device.

2. Description of the Related Art

For example, there is a display device that allows visual recognition of different screens by users located at two different positions by using a display panel of a parallax barrier scheme (for example, Japanese Patent Application Laid-open Publication No. 2005-78092). Recently, it has been typical to have a configuration with what is called a touch detection function to detect a touch on a graphical object displayed on the display panel.

Such an above-described display device that allows visual recognition of different screens by users located at two different positions can have, for example, a configuration that provides different pieces of image information to a user positioned to the right relative to the display device and a user positioned to the left, respectively. In a case where the display device having such a configuration is equipped with a touch detection function, it is needed to determine whether a touch is made on a graphical object displayed on the screen visually recognized by the user positioned to the right relative to the display device or on a graphical object displayed on the screen visually recognized by the user positioned to the left relative to the display device.

For the foregoing reasons, there is a need for a display device capable of identifying an operation target graphical object while having a configuration capable of simultaneously displaying, on the same display region, different graphical objects for viewpoints at two different positions.

SUMMARY

According to an aspect, a display device includes: a display panel including a display region capable of simultaneously displaying a first screen and a second screen, the first screen being visually recognized from a first viewpoint, the second screen being visually recognized from a second viewpoint different from the first viewpoint; a detection sensor including a detection region overlapping the display region; and a control circuit having a first detection function to detect a physical object that is in proximity to the display panel and a second detection function to detect a touch on a graphical object displayed on an operation target screen that is one of the first and second screens. The control circuit determines the operation target screen based on a movement amount of a coordinate on the detection region acquired by the first detection function.

According to an aspect, a display device includes: a display panel including a display region capable of simultaneously displaying a first screen and a second screen, the first screen being visually recognized from a first viewpoint, the second screen being visually recognized from a second viewpoint different from the first viewpoint; a detection sensor including a detection region overlapping the display region; and a control circuit having a first detection function to detect a physical object that is in proximity to the display panel and a second detection function to detect a touch on a graphical object displayed on an operation target screen that is one of the first and second screens. The control circuit determines the operation target screen based on a difference value between a first coordinate on the detection region and a second coordinate on the detection region, the first coordinate being acquired by the first detection function, the second coordinate being acquired by the second detection function.

According to an aspect, a display device includes: a display panel including a display region capable of simultaneously displaying a first screen and a second screen, the first screen being visually recognized from a first viewpoint, the second screen being visually recognized from a second viewpoint different from the first viewpoint; a detection sensor including a detection region overlapping the display region; and a control circuit having a first detection function to detect a physical object that is in proximity to the display panel and a second detection function to detect a touch on a graphical object displayed on an operation target screen that is one of the first and second screens. In the first detection function, the control circuit generates, based on detected values of a plurality of regions acquired by dividing the detection region into the regions, a heat map weighted with the detected values of the regions and determines the operation target screen based on the heat map.

BRIEF DESCRIPTION OF THE DRAWINGS

FIG. 7A is a schematic diagram for description of the concept of processing according to a first embodiment;

FIG. 7B is a schematic diagram for description of the concept of the processing according to the first embodiment;

FIG. 11A is a schematic diagram for description of the concept of processing according to a third embodiment;

FIG. 11B is a schematic diagram for description of the concept of the processing according to the third embodiment;

FIG. 12 is a flowchart illustrating an example of the processing according to the third embodiment;

FIG. 13A is a schematic diagram for description of the concept of processing according to a fourth embodiment;

FIG. 13B is a schematic diagram for description of the concept of the processing according to the fourth embodiment.

DETAILED DESCRIPTION

Aspects (embodiments) of the present disclosure will be described below in detail with reference to the accompanying drawings. Contents described below in the embodiments do not limit the present disclosure. Components described below include those that could be easily thought of by the skilled person in the art and those identical in effect. Components described below may be combined as appropriate. What is disclosed herein is only an example, and any modifications that can be easily conceived by those skilled in the art while maintaining the main purpose of the disclosure are naturally included in the scope of the present disclosure. The drawings may be schematically represented in terms of the width, thickness, shape, etc. of each part compared to those in the actual form for the purpose of clearer explanation, but they are only examples and do not limit the interpretation of the present disclosure. In the present specification and the drawings, the same reference sign is applied to the same elements as those already described for the previously mentioned drawings, and detailed explanations may be omitted as appropriate.

In the present specification and the claims, an expression with "on" in description of an aspect in which one structural body is disposed on another structural body includes both a case in which the one structural body is directly disposed on the other structural body in contact and a case in which the one structural body is disposed above the other structural body with still another structural body interposed therebetween, unless otherwise stated in particular.

Figure 1:
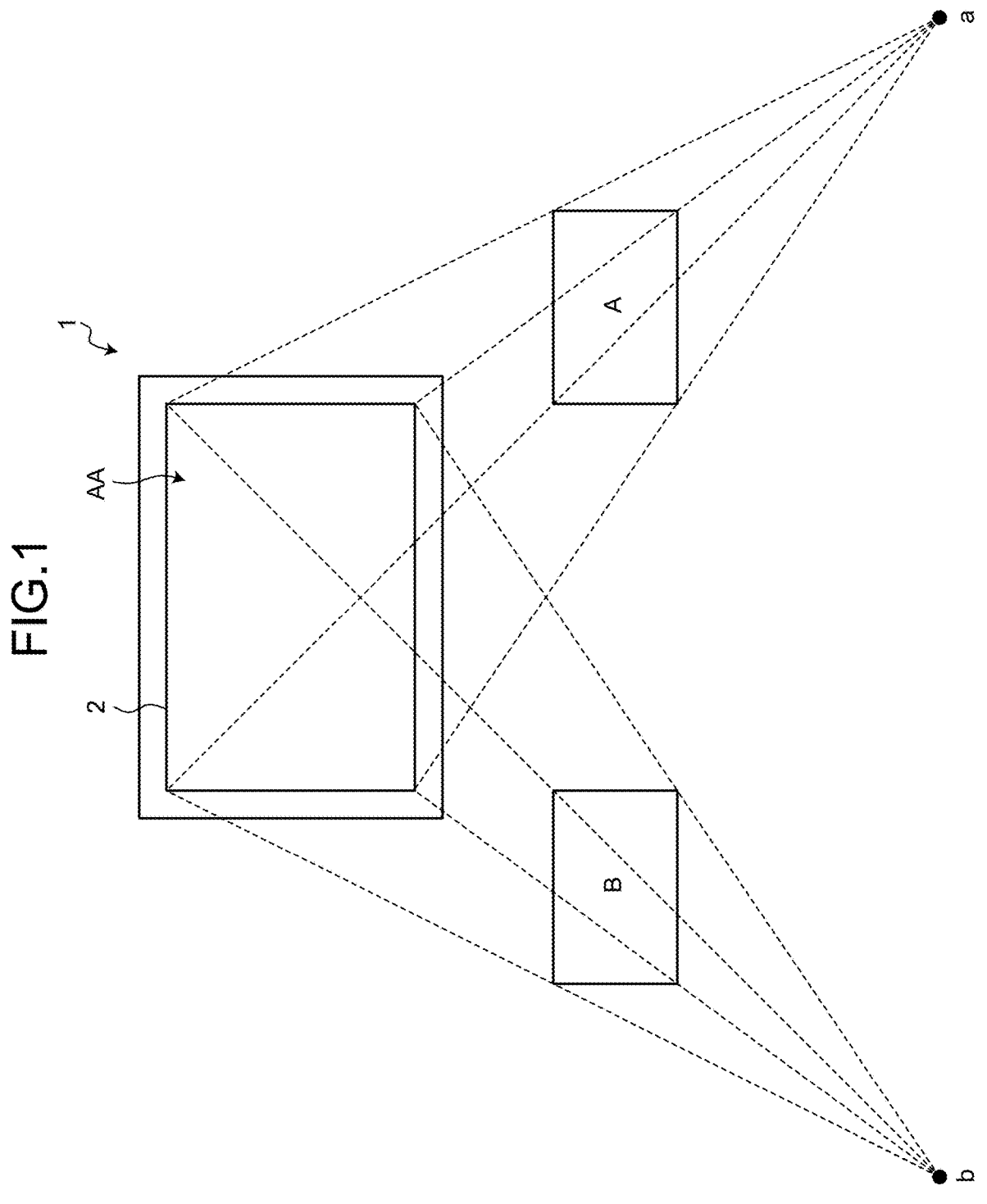
FIG. 1 is a diagram illustrating an overview of a display device according to an embodiment.

FIG. 1 is a diagram illustrating an overview of a display device 1 according to an embodiment. In the present disclosure, the display device 1 is capable of simultaneously displaying screen information for a first screen A and screen information for a second screen B, which are different from each other, on the same display region AA of a display panel 2. The first screen A is a screen visually recognized at a viewpoint "a" of a user positioned on the right in the drawing, and the second screen B is a screen visually recognized at a viewpoint "b" of a user positioned on the left in the drawing. The method of displaying different screens for different viewpoints, respectively, in the display panel 2 of the present disclosure is, for example, a parallax barrier method but not limited thereto. The image information displayed on the first screen A and the image information displayed on the second screen B are not necessarily different from each other but may be the same image information.

The display panel 2 is, for example, a liquid crystal display panel including a backlight but not limited thereto and may be, for example, a light-emitting display panel such as an organic EL display panel (organic light emitting diode or OLED) or an inorganic EL display panel (micro LED or mini LED).

In the present disclosure, the display device 1 has what is called a hover detection (proximity detection) function to detect a physical object (for example, a user's finger) that is in proximity to the display panel 2 and what is called a touch detection function to detect a touch on a graphical object displayed on the display region AA of the display panel 2.

Figure 2:
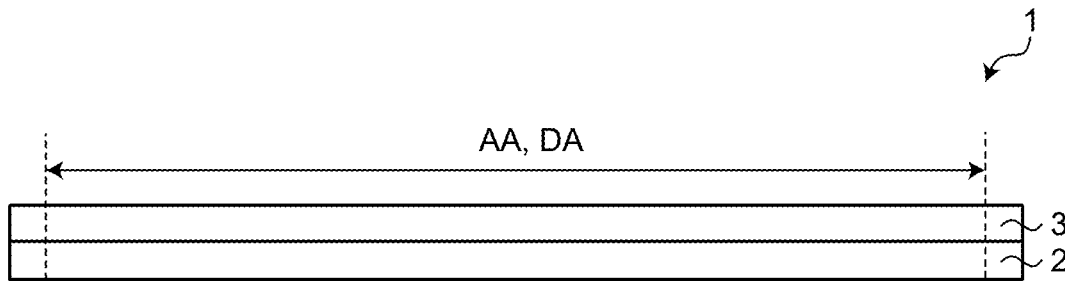
FIG. 2 is a sectional view illustrating an example of a schematic configuration of a display region.

FIG. 2 is a sectional view illustrating an example of a schematic configuration of the display region AA. In the example illustrated in FIG. 2, the display device 1 is what is called an on-cell type device in which a detection sensor 3 that implements the hover detection function and the touch detection function is mounted on the display panel 2. The detection sensor 3 includes a detection region DA overlapping the display region AA of the display panel 2.

The display panel 2 may be what is called an in-cell type or hybrid type device in which the detection sensor 3 is built and integrated. Building in and integrating the detection sensor 3 in the display panel 2 includes, for example, using some members such as substrates and electrodes as the members used for forming the display panel 2 and as the members used for forming the detection sensor 3.

Figure 3A:
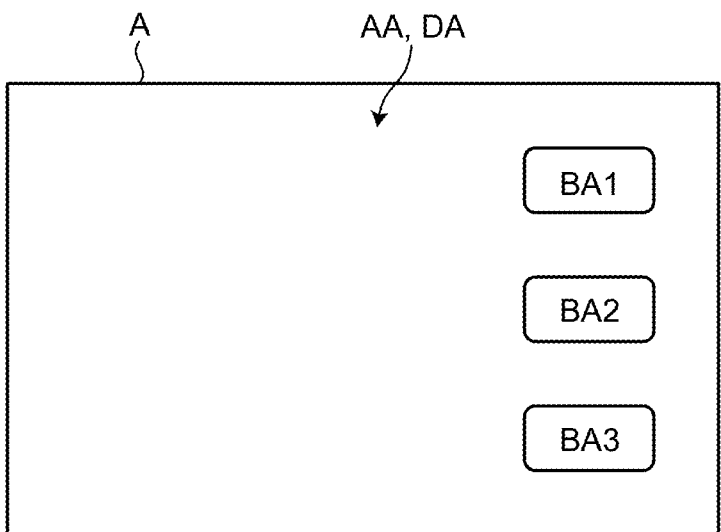
FIG. 3A is a schematic view illustrating an example of the display aspect of a first screen.
Figure 3B:
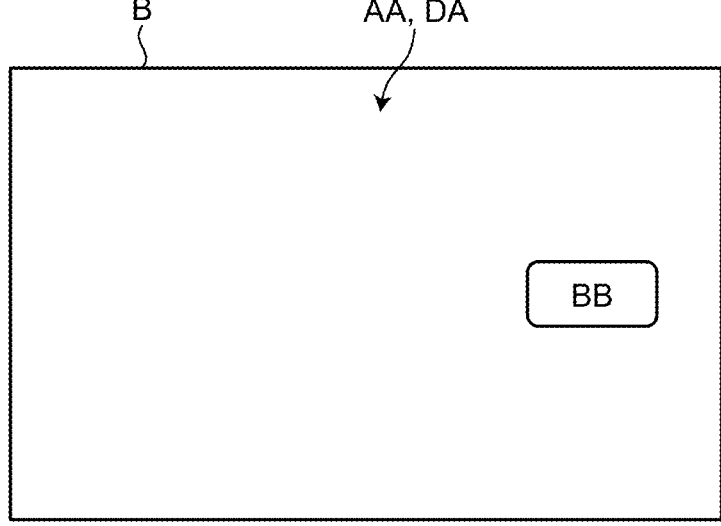
FIG. 3B is a schematic view illustrating an example of the display aspect of a second screen.

FIG. 3A is a schematic view illustrating an example of the display aspect of the first screen A. FIG. 3B is a schematic view illustrating an example of the display aspect of the second screen B. In this aspect, the first screen A illustrated in FIG. 3A and the second screen B illustrated in FIG. 3B are simultaneously displayed on the display region AA, and the screen information displayed on the first screen A and the screen information displayed on the second screen B are different from each other. The first screen A illustrated in FIG. 3A is a screen visually recognized from the viewpoint "a" illustrated in FIG. 1 and not visually recognized from the viewpoint "b" illustrated in FIG. 1. The second screen B illustrated in FIG. 3B is a screen visually recognized from the viewpoint "b" illustrated in FIG. 1 and not visually recognized from the viewpoint "a" illustrated in FIG. 1.

BA1, BA2, and BA3 illustrated in FIG. 3A are images displayed on the first screen A and are graphical objects that can be selected to implement functions allocated to the images by touching positions on the detection region DA overlapping the images.

BB illustrated in FIG. 3B is an image displayed on the second screen B and is a graphical object that can be selected to implement a function allocated to the image by touching a position on the detection region DA overlapping the image.

In the example illustrated in FIG. 3A, three buttons BA1, BA2, and BA3 are displayed on the first screen A. When the user touches any of the buttons BA1, BA2, and BA3, the display device 1 performs operation allocated to the touched button.

In the example illustrated in FIG. 3B, one button BB is displayed on the second screen B. When the user touches the button BB, the display device 1 performs operation allocated to the button BB.

In the present disclosure, the aspect of an operation target graphical object for implementing functional operation expected by the user is not limited to a button-shaped image. The present disclosure includes, for example, an aspect in which when an any position on a screen is touched, a function corresponding to the touch is implemented. In other words, an operation target graphical object in the present disclosure is not limited to an image explicitly displayed on a screen. Specifically, for example, in a display device of a given system such as a navigation system, an operation target graphical object may be an any place on a map displayed on a screen.

The detection sensor 3 detects a touch at a position on the detection region DA corresponding to a button displayed on the display region AA of the display panel 2 irrespective of whether the user is visually recognizing the first screen A or the second screen B. Thus, the display device 1 according to the embodiment needs to determine which of the first screen A and the second screen B the user is visually recognizing when performing a touch operation. In other words, the display device 1 needs to determine whether a touch operation by a user is a touch on a graphical object on the first screen A visually recognized by a user positioned to the right relative to the display device 1 or a touch on a graphical object on the second screen B visually recognized by a user positioned to the left relative to the display device 1.

Specifically, for example, in the display aspect illustrated in FIGS. 3A and 3B, the button BB on the second screen B is located at a position overlapping the button BA2 on the first screen A. In this case, when a position on the detection region DA overlapping the button BA2 on the first screen A is touched by the user with expectation for functional operation corresponding to the button BA2, it is potentially falsely determined that the touch is made on the button BB on the second screen B, which results in false operation.

For example, in the display aspect illustrated in FIGS. 3A and 3B, no graphical object that can be selected is located at a position on the second screen B overlapping the button BAL on the first screen A. In this case, when a position on the detection region DA overlapping the button BA1 on the first screen A is touched by the user with expectation for functional operation corresponding to the button BA1, the operation corresponding to the touch is not potentially performed if it is falsely determined that the touch is made on the second screen B.

Figure 4:
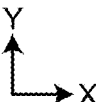
FIG. 4 is a plan view illustrating an example of division of a detection region in a hover detection function.
Figure 5:
FIG. 5 is a plan view illustrating an example of division of the detection region in a touch detection function.

FIG. 4 is a plan view illustrating an example of division of the detection region DA in the hover detection function. FIG. 5 is a plan view illustrating an example of division of the detection region DA in the touch detection function. In the present disclosure, the detection sensor 3 is, for example, what is called a capacitive sensor.

A plurality of detection electrodes 31 are provided in the detection region DA of the detection sensor 3. The detection electrodes 31 in the detection region DA of the detection sensor 3 are arranged in a matrix (row-column configuration) in an X direction (first direction) and a Y direction (second direction) intersecting the X direction. In other words, the detection sensor 3 includes the detection region DA overlapping the detection electrodes 31 arranged in the X and Y directions. In the present disclosure, the X direction (first direction) is a direction extending in a right-left direction relative to the display region AA (detection region DA) of the display device 1, and the Y direction (second direction) is a direction orthogonal to the X direction (first direction). In the present disclosure, the X direction (first direction) defines, as a positive value, a direction from left to right relative to the display region AA (detection region DA) of the display device 1, and the Y direction (second direction) defines, as a positive value, a direction from bottom to top relative to the display region AA (detection region DA) of the display device 1.

In the hover detection function of the present disclosure, the detection region DA is divided into a plurality of first regions PDA1 arranged in a matrix (row-column configuration). In the example illustrated in FIG. 4, each first region PDA1 is defined as a region in which five detection electrodes 31 are arranged in each of the X and Y directions. In other words, in the example illustrated in FIG. 4, each first region PDA1 is constituted by 25 detection electrodes 31, with five detection electrodes 31 arranged in each of the X and Y directions.

In the touch detection function of the present disclosure, the detection region DA is divided into a plurality of second regions PDA2 arranged in a matrix (row-column configuration). In the example illustrated in FIG. 5, each second region PDA2 is defined as a region corresponding to a detection electrode 31. In other words, in the example illustrated in FIG. 5, each second region PDA2 is constituted by one detection electrode 31.

With the capacitance of a single detection electrode 31, the level of a signal acquired in hover detection is too small to ensure sufficient detection accuracy. Thus, as illustrated in FIGS. 4 and 5, the first regions PDA1 in the hover detection function are larger than the second regions PDA2 in the touch detection function. With this configuration, the capacitance of the first regions PDA1 can be set to a capacitance value with which a signal level necessary for hover detection can be acquired.

The aspect of the detection region DA in the present disclosure is not limited to the aspect illustrated in FIGS. 4 and 5. For example, in the configuration of the display device 1, the detection sensor 3 may include detection electrodes corresponding to the first regions PDA1, on a one-to-one basis. Alternatively, for example, in the configuration of the display device 1, a first detection sensor having the hover detection function and a second detection sensor having the touch detection function may be included. In this case, the first detection sensor may include detection electrodes corresponding to the first regions PDA1, on a one-to-one basis, and the second detection sensor may include detection electrodes corresponding to the second regions PDA2, on a one-to-one basis.

Figure 6:
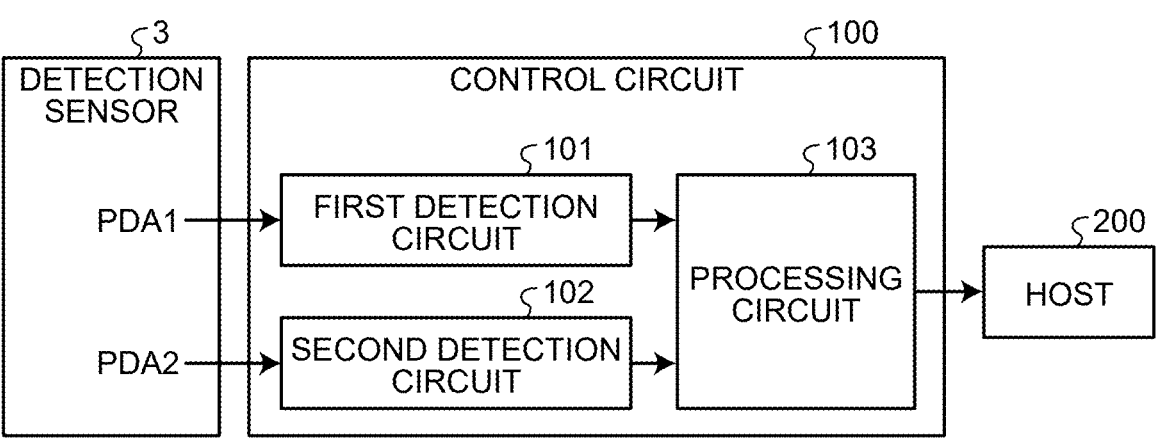
FIG. 6 is a block diagram illustrating an example of a schematic configuration of a control circuit according to the embodiment.

FIG. 6 is a block diagram illustrating an example of a schematic configuration of a control circuit 100 according to the embodiment. In the configuration example illustrated in FIG. 6, the control circuit 100 of the display device 1 according to the embodiment includes a first detection circuit 101, a second detection circuit 102, and a processing circuit 103.

The first detection circuit 101 is a circuit that performs hover detection based on signals output from the first regions PDA1 of the detection sensor 3. The second detection circuit 102 is a circuit that performs touch detection based on signals output from the second regions PDA2 of the detection sensor 3. In the present disclosure, the first detection circuit 101 and the second detection circuit 102 each include, for example, an analog front end circuit (AFE) and an AD conversion circuit.

The first detection circuit 101 outputs, to the processing circuit 103, first sensing data indicating detected values during hover detection operation. The second detection circuit 102 outputs, to the processing circuit 103, second sensing data indicating detected values during touch detection operation.

The processing circuit 103 is a circuit that outputs touch detection positions (coordinates) to a HOST 200 at a later stage. The processing circuit 103 is constituted by, for example, a micro control unit (MCU), a RAM, an EEPROM, and a ROM. The HOST 200 is, for example, a navigation system in which the display device 1 is mounted.

In the present disclosure, the processing circuit 103 in each processing according to embodiments to be described later has a function of performing the following determination process and the following output process. In the determination process, the processing circuit 103 determines, based on the first sensing data from the first detection circuit 101 and the second sensing data from the second detection circuit 102, whether a touch detection position on the detection region DA is a position corresponding to a graphical object on the first screen (first screen A visually recognized from the viewpoint "a" illustrated in FIG. 1) or a position corresponding to a graphical object on the second screen (second screen B visually recognized from the viewpoint "b" illustrated in FIG. 1). In the output process, the processing circuit 103 outputs the result of the determination to the HOST 200.

In the configuration of the display device 1, the second detection circuit 102 is unnecessary, for example, in a case where the detection sensor 3 includes detection electrodes corresponding to the first regions PDA1, on a one-to-one basis. In this case, the first detection circuit 101 may have a function to output the first sensing data indicating detected values in hover detection operation or touch detection operation to the processing circuit 103, and the processing circuit 103 may have a function to determine, based on the first sensing data from the first detection circuit 101, whether a touch detection position on the detection region DA is a position corresponding to a graphical object on the first screen (first screen A visually recognized from the viewpoint "a" illustrated in FIG. 1) or a position corresponding to a graphical object on the second screen (second screen B visually recognized from the viewpoint "b" illustrated in FIG. 1) and output the result of the determination to the HOST 200.

The following describes embodiments in which an operation target graphical object can be identified in the configuration of the control circuit 100 of the display device 1 according to the embodiment, which is capable of displaying, on the same display region, different graphical objects for viewpoints at two different positions.

First Embodiment

FIGS. 7A and 7B are schematic diagrams for description of the concept of processing according to a first embodiment.

FIG. 7A illustrates an example in which the user visually recognizes the first screen A from the viewpoint "a" on the right relative to the display region AA (detection region DA) of the display device 1 and is attempting to operate a graphical object on the first screen A.

FIG. 7B illustrates an example in which the user visually recognizes the second screen B from the viewpoint "b" on the left relative to the display region AA (detection region DA) of the display device 1 and is attempting to operate a graphical object on the second screen B.

In the case where the user is positioned to the right relative to the display region AA (detection region DA) of the display device 1, it is assumed that a user's finger moves from the right to the left when operating a graphical object on the corresponding screen.

In contrast, in a case where the user is positioned to the left relative to the display region AA (detection region DA) of the display device 1, it is assumed that a user's finger moves from left to right when operating a graphical object on the corresponding screen.

Specifically, in a case where a hover detection position in the X direction moves from x1 on the right to x2 on the left on the detection region DA as illustrated in FIG. 7A, it is assumed that the user is positioned to the right while facing the display device 1 and is attempting to operate a graphical object on the first screen A visually recognized from the viewpoint "a". In a case where a hover detection position in the X direction moves from x1 on the left to x2 on the right on the detection region DA as illustrated in FIG. 7B, it is assumed that the user is positioned to the left while facing the display device 1 and is attempting to operate a graphical object on the second screen B visually recognized from the viewpoint "b".

With the concept of the processing according to the first embodiment described above, hover detection is performed for the moving direction of a user's finger moving above the detection region DA, the moving direction of the user's finger is acquired based on a movement amount in the X direction when the hover detection is performed, and an operation target screen is determined based on the moving direction in the first embodiment.

More specifically, in the first embodiment, a movement amount $\Delta xm$ ($=x1-x2$) between a first hover detection position at a first time point and a second hover detection position at a second time point later than the first time point in the X direction is acquired during hover detection operation, a graphical object on the first screen A is determined to be an operation target graphical object when the movement amount $\Delta xm$ is equal to or larger than zero ($\Delta xm \geq 0$), and a graphical object on the second screen B is determined to be an operation target graphical object when the movement amount $\Delta xm$ is smaller than zero ($\Delta xm < 0$).

Figure 8:
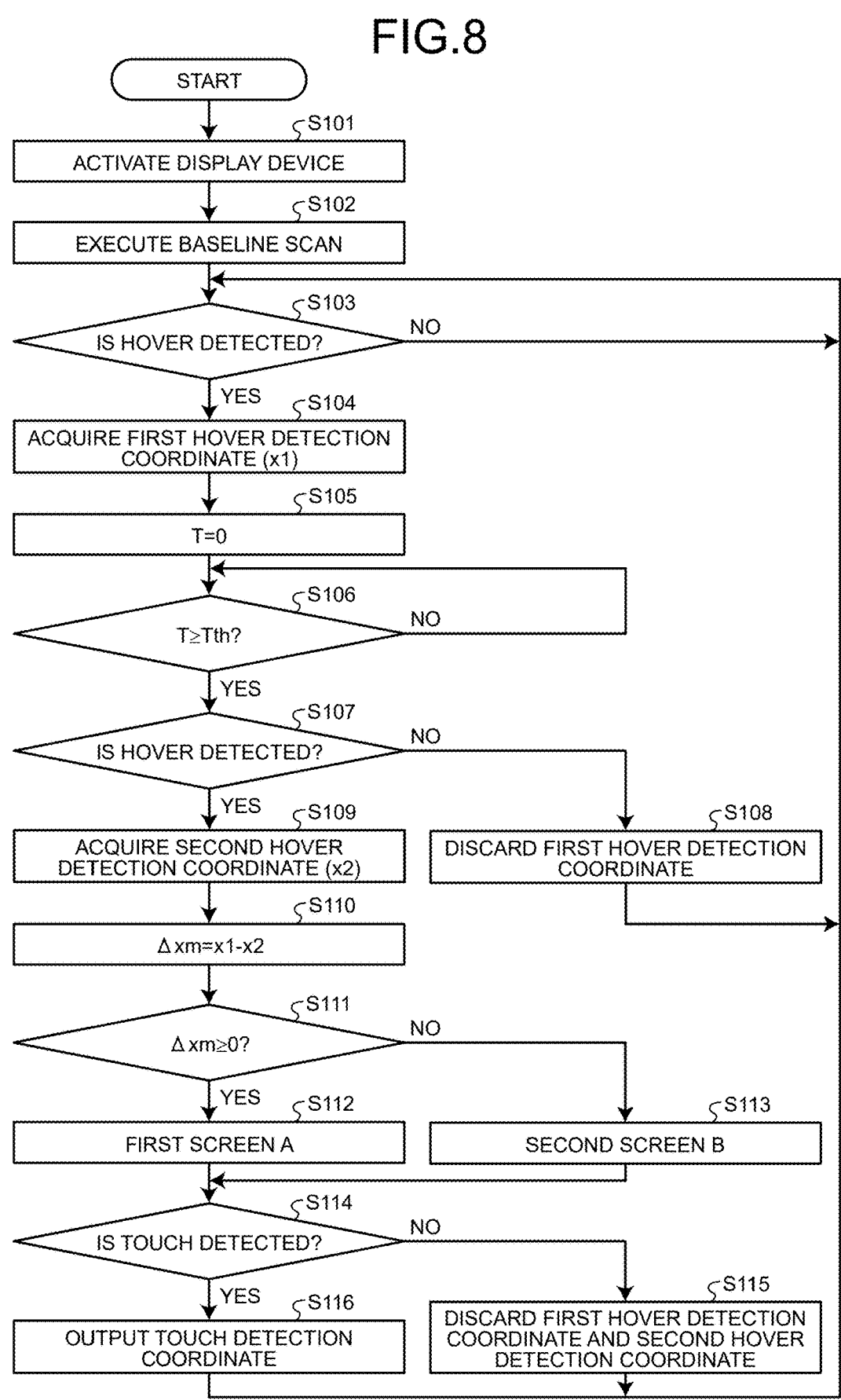
FIG. 8 is a flowchart illustrating an example of the processing according to the first embodiment.

The following describes specific processing in the control circuit 100 of the display device 1 according to the first embodiment with reference to FIG. 8. FIG. 8 is a flowchart illustrating an example of the processing according to the first embodiment.

In the processing illustrated in FIG. 8, when the display device 1 according to the embodiment is activated, for example, upon activation of the HOST 200 (for example, a navigation system in which the display device 1 is mounted) (step S101), the control circuit 100 executes baseline scan for acquiring the first and second sensing data while no detection target is in proximity to the display panel 2 (step S102).

After the execution of the baseline scan (step S102), the control circuit 100 executes normal hover detection operation and touch detection operation.

Specifically, the control circuit 100 executes hover detection processing based on the difference between the first sensing data acquired by the baseline scan (step S102) and the first sensing data acquired by the normal hover detection operation. The control circuit 100 executes touch detection processing based on the difference between the second sensing data acquired by the baseline scan (step S102) and the second sensing data acquired by the normal touch detection operation.

In the present disclosure, the normal hover detection operation is hover detection operation that is executed after the baseline scan (step S102). In the present disclosure, the normal touch detection operation is touch detection operation that is executed after the baseline scan (step S102).

In the following description, when a physical object (for example, a user's finger) that is in proximity to the display panel 2 is detected during hover detection operation, it is simply referred to as "a hover is detected" in some cases. When a touch on the display panel 2 is detected, it is simply referred to as "a touch is detected" in some cases.

The processing circuit 103 of the control circuit 100 determines whether a hover is detected during hover detection operation (step S103). When no hover is detected (No at step S103), the processing at step S103 is repeatedly executed.

When a hover is detected (Yes at step S103), the processing circuit 103 acquires a position where the hover is detected as a first hover detection coordinate (step S104), sets a time point when the hover is detected as the first time point, sets the next hover detection time point as the second time point, and resets a timer value T that measures a time Tth to the second time point (T=0; step S105).

The processing circuit 103 determines whether the timer value T has become equal to or larger than Tth (T≥Tth; step S106). When the timer value T is smaller than Tth (T<Tth; No at step S106), the processing at step S106 is repeatedly executed until the timer value T becomes equal to or larger than Tth (T≥Tth; Yes at step S106).

When the timer value T has become equal to or larger than Tth (T≥Tth; Yes at step S106), the processing circuit 103 determines whether a hover is detected again (step S107). When no hover is detected (No at step S107), the first hover detection coordinate at the first time point is discarded (step S108) and the processing starting from step S103 is re-executed.

When no hover is detected at step S107 (No at step S107), it is assumed that the detection of a hover in the processing at step S103 performed the previous time is not attributable to a user's intentional operation. Thus, when no hover is detected in the processing at step S107 (No at step S107), the first hover detection coordinate at the first time point is discarded (step S108) and the process returns to the processing at step S103.

When a hover is detected (Yes at step S107) at step S107, the processing circuit 103 acquires a position where the hover is detected as a second hover detection coordinate at the second time point (step S109). Then, the processing circuit 103 calculates the difference value $\Delta xm$ between X-direction data x1 of the first hover detection coordinate at the first time point and X-direction data x2 of the second hover detection coordinate at the second time point ($\Delta xm=x1-x2$; step S110). The difference value $\Delta xm$ indicates the X-directional movement amount between the first hover detection position at the first time point and the second hover detection position at the second time point, and more specifically, is a value obtained by subtracting the X-direction data x2 of the second hover detection coordinate at the second time point from the X-direction data x1 of the first hover detection coordinate at the first time point.

The processing circuit 103 executes determination processing of a touch operation target screen after the described-above hover detection based on the difference value $\Delta xm$ calculated in the processing at step S110 and outputs, to the HOST 200, a touch detection position on the touch operation target screen based on the result of the determination processing.

Specifically, the processing circuit 103 determines whether the difference value $\Delta xm$ calculated in the processing at step S110 is equal to or larger than zero ($\Delta xm \geq 0$; step S111).

When the difference value $\Delta xm$ is equal to or larger than zero ($\Delta xm \geq 0$; Yes at step S111), the processing circuit 103 determines that a touch on the display panel 2 after the above-described hover detection is an operation on a graphical object on the first screen A (step S112). Then, it is determined whether a touch is detected (step S114). When no touch is detected (No at step S114), the first hover detection coordinate at the first time point and the second hover detection coordinate at the second time point are discarded (step S115) and the processing starting from step S103 is re-executed. When a touch is detected (Yes at step S114), a position where the touch is detected is output to the HOST 200 as a touch detection coordinate on the first screen A (step S116).

When the difference value $\Delta xm$ is smaller than zero ($\Delta xm<0$; No at step S111), the processing circuit 103 determines that a touch on the display panel 2 after the above-described hover detection is an operation on a graphical object on the second screen B (step S113), and determines whether a touch is detected (step S114). When no touch is detected (No at step S114), the first hover detection coordinate at the first time point and the second hover detection coordinate at the second time point are discarded (step S115) and the processing starting from step S103 is re-executed. When a touch is detected (Yes at step S114), a position where the touch is detected is output to the HOST 200 as a touch detection coordinate on the second screen B (step S116).

After the processing circuit 103 outputs, to the HOST 200, the touch detection coordinate on a screen determined to be a touch operation target screen in the above-described determination processing of a touch operation target screen (step S116), the processing circuit 103 re-executes the processing starting from step S103.

Second Embodiment

Figures 9A, 9B:
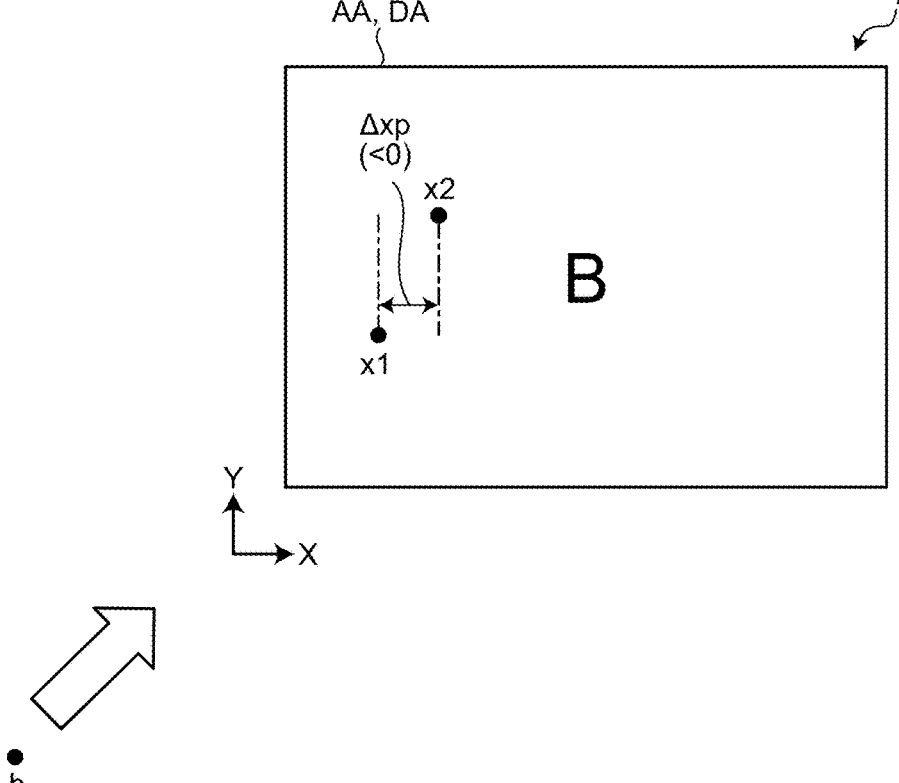
FIG. 9A is a schematic diagram for description of the concept of processing according to a second embodiment.
FIG. 9B is a schematic diagram for description of the concept of the processing according to the second embodiment.

FIGS. 9A and 9B are schematic diagrams for description of the concept of processing according to a second embodiment.

FIG. 9A illustrates an example in which the user visually recognizes the first screen A from the viewpoint "a" on the right relative to the display region AA (detection region DA) of the display device 1 and is attempting to operate a graphical object on the first screen A.

FIG. 9B illustrates an example in which the user visually recognizes the second screen B from the viewpoint "b" on the left relative to the display region AA (detection region DA) of the display device 1 and is attempting to operate a graphical object on the second screen B.

In a case where the user is positioned to the right relative to the display region AA (detection region DA) of the display device 1, the positional relation between a hover detection coordinate acquired by hover detection operation and a touch detection coordinate acquired by touch detection operation when a graphical object on the corresponding screen is operated, is assumed to be such that the X-directional position x2 of the touch detection coordinate is positioned to the left relative to the X-directional position x1 of the hover detection coordinate as illustrated in FIG. 9A.

In contrast, in a case where the user is positioned to the left relative to the display region AA (detection region DA) of the display device 1, the positional relation between a hover detection coordinate acquired by hover detection operation and a touch detection coordinate acquired by touch detection operation when a graphical object on the corresponding screen is operated, is assumed to be such that the X-directional position x2 of the touch detection coordinate is positioned to the right relative to the X-directional position x1 of the hover detection coordinate as illustrated in FIG. 9B.

With the concept of processing according to the second embodiment described above, an operation target screen is determined based on the difference value between an X-directional hover detection position acquired by hover detection operation and an X-directional touch detection position acquired by touch detection operation in the second embodiment.

More specifically, in the second embodiment, an X-directional difference value $\Delta xp$ ($=x1-x2$) between a hover detection position during hover detection operation and a touch detection position during touch detection operation is acquired, a graphical object on the first screen A is determined to be an operation target graphical object when the difference value Δxp is equal to or larger than zero (Δxp≥0), and a graphical object on the second screen B is determined to be an operation target graphical object when the difference value Δxp is smaller than zero (Δxp<0).

Figure 10:
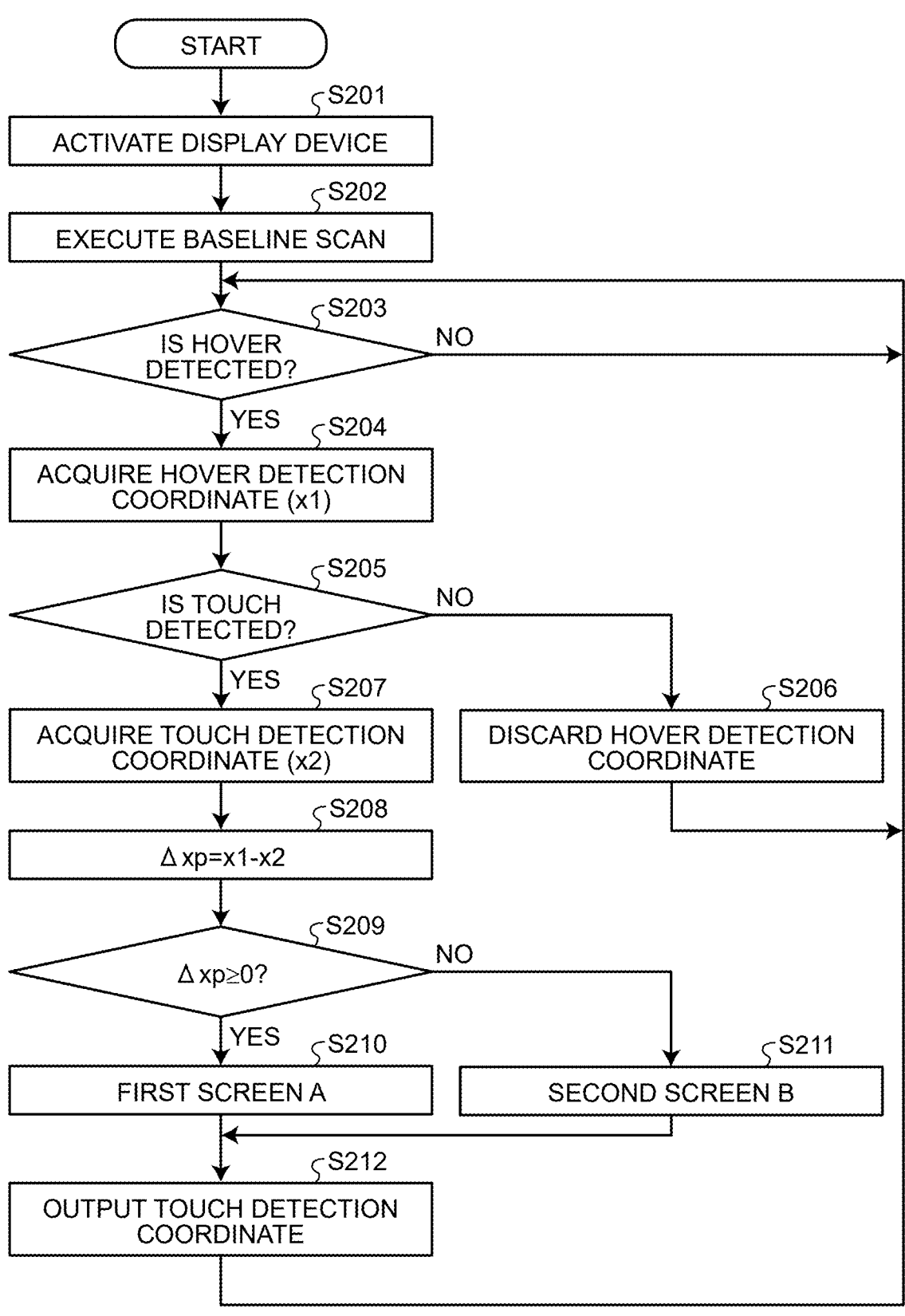
FIG. 10 is a flowchart illustrating an example of the processing according to the second embodiment.

The following describes specific processing in the control circuit 100 of the display device 1 according to the second embodiment with reference to FIG. 10. FIG. 10 is a flowchart illustrating an example of the processing according to the second embodiment. In the processing illustrated in FIG. 10, processing at steps S201 and S202 is the same as the processing at steps S101 and S102 in the processing (refer to FIG. 8) of the first embodiment, and thus detailed description thereof will be omitted.

The processing circuit 103 of the control circuit 100 determines whether a hover is detected during hover detection operation (step S203). When no hover is detected (No at step S203), the processing at step S203 is repeatedly executed.

When a hover is detected (Yes at step S203), the processing circuit 103 acquires a position where the hover is detected as a hover detection coordinate (step S204).

Subsequently, the processing circuit 103 determines whether a touch is detected during touch detection operation (step S205). When no touch is detected (No at step S205), the hover detection coordinate is discarded (step S206) and the processing starting from step S203 is re-executed.

When no touch is detected at step S205 (No at step S205), it is assumed that the hover is detected at the position of a user's finger attempting to perform a touch operation in the hover detection in the processing at step S203. When the processing at step S205 is repeatedly executed until a touch is detected while the hover detection coordinate obtained in the hover detection is held, the position of the hover detection coordinate potentially becomes substantially the same as the position of a touch detection coordinate. Thus, when no touch is detected in the processing at step S205 (No at step S205), the hover detection coordinate is discarded (step S206) and the process returns to the processing at step S203.

When a touch is detected (Yes at step S205), the processing circuit 103 acquires a position where the touch is detected as a touch detection coordinate (step S207). Then, the processing circuit 103 calculates the difference value Δxp between the X-direction data x1 of the hover detection coordinate and the X-direction data x2 of the touch detection coordinate (Δxp=x1−x2; step S208). More specifically, the difference value Δxp is a value obtained by subtracting the X-direction data x2 of the touch detection coordinate from the X-direction data x1 of the hover detection coordinate.

The processing circuit 103 executes determination processing of a touch operation target screen at the touch detection coordinate acquisition based on the difference value Δxp calculated in the processing at step S110, and outputs, to the HOST 200, a touch detection position on the touch operation target screen based on the result of the determination processing.

Specifically, the processing circuit 103 determines whether the difference value Δxp calculated in the processing at step S208 is equal to or larger than zero (Δxp≥0; step S209).

When the difference value Δxp is equal to or larger than zero (Δxp≤0; Yes at step S209), the processing circuit 103 determines that the operation at the touch detection coordinate acquisition is an operation on a graphical object on the first screen A (step S210), and outputs the acquired touch detection coordinate to the HOST 200 as a position on the first screen A (step S212).

When the difference value Δxp is smaller than zero (Δxp<0; No at step S209), the processing circuit 103 determines that the operation at the touch detection coordinate acquisition is an operation on a graphical object on the second screen B (step S211), and outputs the acquired touch detection coordinate to the HOST 200 as a position on the second screen B (step S212).

Then, the processing circuit 103 outputs, to the HOST 200, the touch detection coordinate on a screen determined to be a touch operation target screen in the above-described determination processing of a touch operation target screen (step S212), and then re-executes the processing starting from step S203.

In the above-described example of the processing according to the second embodiment, touch detection operation is executed after hover detection operation is executed, but the present disclosure is not limited thereto. For example, hover detection operation may be executed after touch detection operation is executed, or hover detection operation and touch detection operation may be simultaneously executed.

Third Embodiment

FIGS. 11A and 11B are schematic diagrams for description of the concept of processing according to a third embodiment.

FIG. 11A illustrates the first sensing data acquired for each first region PDA1 by the first detection circuit 101 when the user visually recognizes the first screen A from the viewpoint "a" on the right relative to the display region AA (detection region DA) of the display device 1 and is attempting to operate a graphical object on the first screen A. The drawing exemplarily illustrates a heat map weighted with the first sensing data acquired for each first region PDA1 by the first detection circuit 101. In the present disclosure, a heat map is defined as visualization of the magnitude relation of the first sensing data in grayscale of the first regions PDA1, corresponding to the first regions PDA1 arranged in a matrix (row-column configuration) illustrated in FIG. 4. In FIG. 11A, first regions PDA1 with larger first sensing data are illustrated darker, and first regions PDA1 with smaller first sensing data are illustrated lighter.

FIG. 11B illustrates the first sensing data acquired for each first regions PDA1 by the first detection circuit 101 when the user visually recognizes the second screen B from the viewpoint "b" on the left relative to the display region AA (detection region DA) of the display device 1 and is attempting to operate a graphical object on the second screen B. The drawing exemplarily illustrates a heat map weighted with the first sensing data acquired for each first region PDA1 by the first detection circuit 101. In FIG. 11B, as in FIG. 11A, first regions PDA1 with larger first sensing data are illustrated darker, and first regions PDA1 with smaller first sensing data are illustrated lighter.

When the user operates a graphical object on a display screen of the display device 1, it is assumed that different shapes appear on the heat map weighted with the first sensing data of each first region PDA1, depending on whether the operation is performed with the right hand or the left hand.

Specifically, in a case where the user is positioned to the right relative to the display region AA (detection region DA) of the display device 1, it is assumed that a graphical object on the display screen of the display device 1 is operated (touched) with the left hand. In contrast, in a case where the user is positioned to the left relative to the display region AA (detection region DA) of the display device 1, it is assumed that a graphical object on the display screen of the display device 1 is operated (touched) with the right hand. A shape that appears on the heat map weighted with the first sensing data of each first region PDA1 is highly correlated with whether a finger attempting to operate is from the left hand or the right hand.

Moreover, a tilt Ti at the barycenter position of the heat map weighted with the first sensing data acquired for each first region PDA1 by hover detection operation varies depending on whether a finger attempting to operate is from the left hand or the right hand.

Specifically, in a case where it is assumed that the user is positioned to the right relative to the display region AA (detection region DA) of the display device 1 and operates (touches) a graphical object on the display screen of the display device 1 with the left hand as illustrated in FIG. 11A, the tilt Ti at the barycenter position of the heat map weighted with the first sensing data of each first region PDA1 is positive when the Y direction is defined as 0 degrees, the tilt to the right relative to the Y direction is defined as a positive tilt, and the tilt to the left is defined as a negative tilt.

In contrast, in a case where it is assumed that the user is positioned to the left relative to the display region AA (detection region DA) of the display device 1 and operates (touches) a graphical object on the display screen of the display device 1 with the right hand as illustrated in FIG. 11B, the tilt Ti at the barycenter position of the heat map weighted with the first sensing data of each first region PDA1 is negative.

With the concept of processing according to the third embodiment described above, an operation target screen is determined based on the tilt Ti at the barycenter position of the heat map weighted with the first sensing data acquired for each first region PDA1 by hover detection operation in the third embodiment.

More specifically, in the third embodiment, a heat map in the aspect illustrated in FIG. 11A or FIG. 11B is generated based on the first sensing data acquired for each first region PDA1 by hover detection operation, the tilt Ti at the barycenter position of the heat map is calculated, a graphical object on the first screen A is determined to be an operation target graphical object in a case where the tilt Ti at the barycenter position of the heat map is equal to or larger than 0 degrees (Ti≥0 degrees), and a graphical object on the second screen B is determined to be an operation target graphical object in a case where the tilt Ti at the barycenter position of the heat map is smaller than 0 degrees (Ti<0 degrees).

The following describes specific processing in the control circuit 100 of the display device 1 according to the third embodiment with reference to FIG. 12. FIG. 12 is a flowchart illustrating an example of the processing according to the third embodiment. In the processing illustrated in FIG. 12, processing at steps S301 and S302 is the same as the processing at steps S101 and S102 in the processing (refer to FIG. 8) of the first embodiment, and thus detailed description thereof will be omitted.

Based on the first sensing data acquired by baseline scan (step S302), the processing circuit 103 of the control circuit 100 sets a threshold Hth for hover detection operation (step S303).

In normal hover detection operation, it is assumed that hover detection is performed for the position of a user's finger attempting to perform a touch operation, for example. In this case, in a large number of first regions PDA1, the first sensing data acquired during normal hover detection operation decreases, which potentially causes decrease in the determination accuracy. Thus, the threshold Hth for hover detection operation is set (step S303); and in processing at steps S304 to S309 to be described later, a heat map corresponding to the shape of the user's finger is generated when the first sensing data acquired for the first regions PDA1 on the detection region DA includes the first sensing data equal to or larger than the threshold Hth.

Specifically, in the processing illustrated in FIG. 12, the processing circuit 103 of the control circuit 100 first acquires first sensing data Hn (n is an integer of 1 to N, where N is the total number of first regions PDA1 in the detection region DA) of each first region PDA1 (*n*) as in normal hover detection operation (step S304).

Subsequently, the processing circuit 103 resets the number n (n is an integer of 0 to N) of the first sensing data Hn (n=0; step S305) and determines whether the number n is smaller than N−1 (n<N−1; step S306).

When the number n is smaller than N−1 (n<N−1; Yes at step S306), the number n is incremented (n=n+1; step S307), and it is determined whether the first sensing data Hn is equal to or larger than the threshold Hth (Hn≥Hth; step S308). When the first sensing data Hn is smaller than the threshold Hth (Hn<Hth; No at step S308), the processing starting from step S306 is re-executed.

If the number n has become equal to N−1 at step S306 (n=N−1; No at step S306), the first sensing data Hn acquired in the processing at step S304 is discarded (step S309) and the processing starting from step S304 is re-executed.

If the first sensing data Hn has become equal to or larger than the threshold Hth (Hn≥Hth; Yes at step S308), a heat map in the aspect illustrated in FIGS. 11A and 11B is generated by using the first sensing data Hn acquired in the processing at step S304 (step S310), and the tilt Ti at the barycenter position of the heat map weighted with the first sensing data is calculated (step S311).

The processing circuit 103 executes determination processing of a touch operation target screen after above-described acquisition of the first sensing data Hn based on the tilt Ti at the barycenter position of the heat map, which is calculated in the processing at step S310, and outputs a touch detection position on the touch operation target screen to the HOST 200 based on the result of the determination processing.

Specifically, the processing circuit 103 determines whether the tilt Ti at the barycenter position of the heat map, which is calculated in the processing at step S310, is equal to or larger than 0 degrees (Ti≥0 degrees; step S312).

As described above, the Y direction is defined as 0 degrees, the tilt to the right relative to the Y direction is defined as a positive tilt, and the tilt to the left is defined as a negative tilt. Specifically, when the tilt Ti at the barycenter position of the heat map is equal to or larger than 0 degrees (Ti≥0 degrees; Yes at step S312), the processing circuit 103 determines that a touch on the display panel 2 after the above-described acquisition of the first sensing data Hn is an operation on a graphical object on the first screen A (step S313). Then, it is determined whether a touch is detected (step S315), and when no touch is detected (No at step S315), the heat map is discarded (step S316) and the processing starting from step S304 is re-executed. When a touch is detected (Yes at step S315), a position where the touch is detected is output to the HOST 200 as a touch detection coordinate on the first screen A (step S317).

When the tilt Ti at the barycenter position of the heat map is smaller than 0 degrees (Ti<0 degrees, No at step S312), the processing circuit 103 determines that a touch on the display panel 2 after the above-described acquisition of the first sensing data Hn is an operation on a graphical object on the second screen B (step S314). Then, it is determined whether a touch is detected (step S315), and when no touch is detected (No at step S315), the heat map is discarded (step S316) and the processing starting from step S304 is re-executed. When a touch is detected (Yes at step S315), a position where the touch is detected is output to the HOST 200 as a touch detection coordinate on the second screen B (step S317).

Then, the processing circuit 103 outputs the touch detection coordinate on a screen determined to be a touch operation target screen in the above-described determination processing of a touch operation target screen to the HOST 200 (step S317), and then re-executes the processing starting from step S304.

Fourth Embodiment

FIGS. 13A and 13B are schematic diagrams for description of the concept of processing according to a fourth embodiment.

FIG. 13A illustrates a touch detection coordinate P acquired during touch detection operation of a touch on a graphical object on the first screen A by the user visually recognizing the first screen A from the viewpoint "a" on the right relative to the display region AA (detection region DA) of the display device 1, and the first sensing data acquired for each first region PDA1 by the first detection circuit 101 at a touch detection time point. The drawing exemplarily illustrates a heat map weighted with the first sensing data acquired for each first region PDA1 by the first detection circuit 101. In FIG. 13A, first regions PDA1 with larger first sensing data are illustrated darker, and first regions PDA1 with smaller first sensing data are illustrated lighter.

FIG. 13B illustrates a touch detection coordinate P acquired during touch detection operation of a touch on a graphical object on the second screen B by the user visually recognizing the second screen B from the viewpoint "b" on the left relative to the display region AA (detection region DA) of the display device 1, and the first sensing data of each first region PDA1 acquired by the first detection circuit 101 at a touch detection time point. The drawing exemplarily illustrates a heat map weighted with the first sensing data acquired for each first region PDA1 by the first detection circuit 101. In FIG. 13B, as in FIG. 13A, first regions PDA1 with larger first sensing data are illustrated darker, and first regions PDA1 with smaller first sensing data are illustrated lighter.

In the fourth embodiment, a first heat map in the aspect illustrated in FIG. 13A and a second heat map in the aspect illustrated in FIG. 13B are held in, for example, the EEPROM or ROM of the processing circuit 103 in advance. Then, matching processing is executed between a heat map acquired in processing according to the fourth embodiment to be described later and the first and second heat maps held in advance, and accordingly, an operation target screen is determined.

More specifically, in the fourth embodiment, a heat map is generated based on the first sensing data acquired for each first region PDA1 by hover detection operation after touch detection coordinate acquisition. Matching processing is executed between the generated heat map and the first heat map. When the generated heat map matches the first heat map, a graphical object on the first screen A is determined to be an operation target graphical object. Matching processing is executed between the heat map generated based on the first sensing data acquired in each first region PDA1 by hover detection operation after touch detection coordinate acquisition and the second heat map. When the generated heat map matches the second heat map, a graphical object on the second screen B is determined to be an operation target graphical object.

The first heat map may be, for example, a heat map acquired in advance assuming that the first screen A serves as an operation target screen. The second heat map may be, for example, a heat map acquired in advance assuming that the second screen B serves as an operation target screen. In the present disclosure, a known determination method may be employed in matching processing between a heat map acquired in a detection period and the first or second heat map held in advance. The present disclosure is not limited by the heat map matching determination method in the present disclosure.

Figure 14:
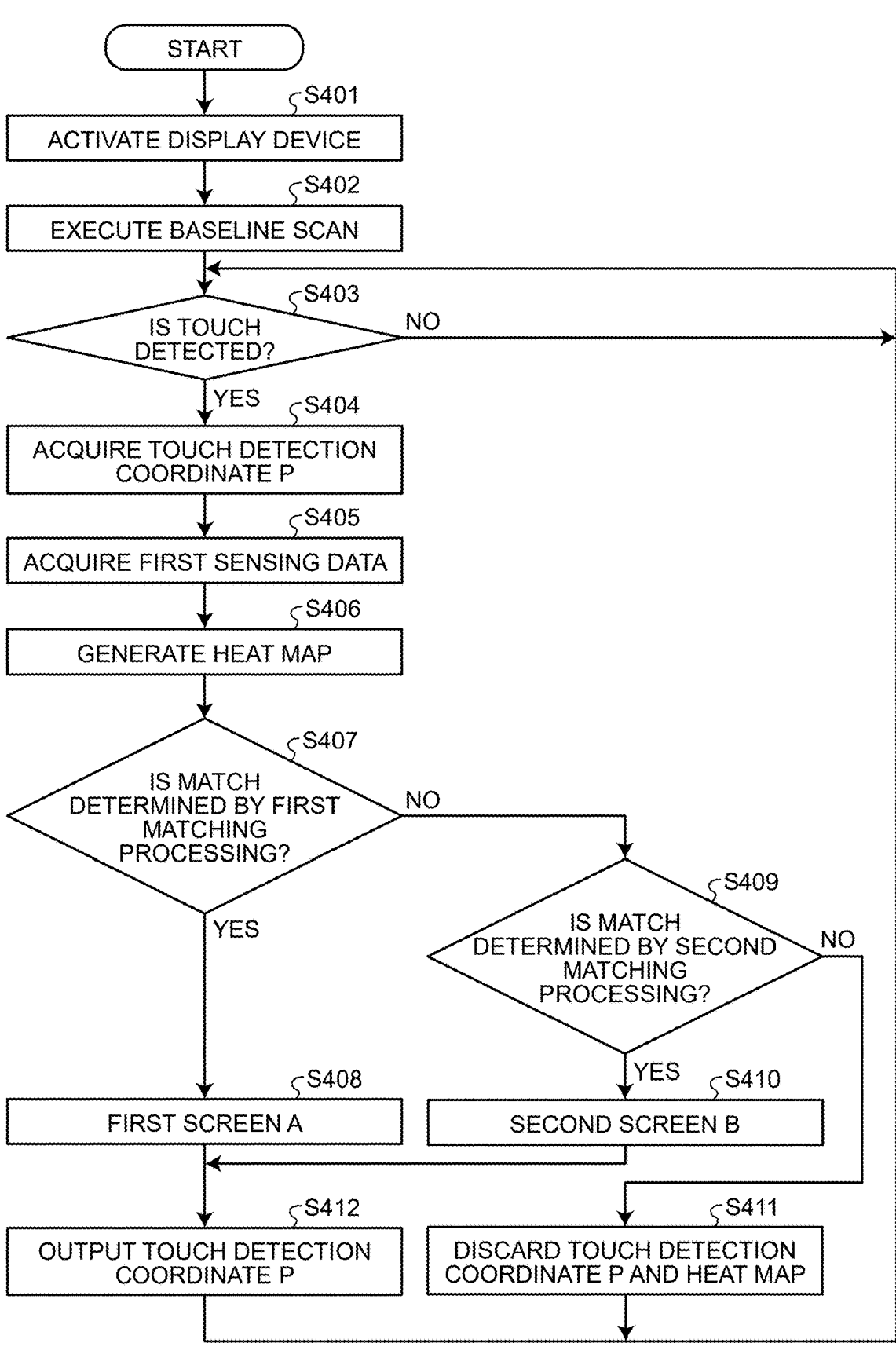
FIG. 14 is a flowchart illustrating an example of the processing according to the fourth embodiment.

The following describes specific processing in the control circuit 100 of the display device 1 according to the fourth embodiment with reference to FIG. 14. FIG. 14 is a flowchart illustrating an example of the processing according to the fourth embodiment. In the present disclosure, the processing illustrated in FIG. 14 is processing executed in a detection period different from a period in which the first and second heat maps are acquired. In the processing illustrated in FIG. 14, processing at steps S401 and S402 is the same as the processing at steps S101 and S102 in the processing (refer to FIG. 8) of the first embodiment, and thus detailed description thereof will be omitted.

The processing circuit 103 of the control circuit 100 determines whether a touch is detected during touch detection operation (step S403). When no touch is detected (No at step S403), the processing at step S403 is repeatedly executed.

When a touch is detected (Yes at step S403), the processing circuit 103 acquires a position where the touch is detected as a touch detection coordinate P (step S404).

Subsequently, the processing circuit 103 executes heat map generation processing. Specifically, the processing circuit 103 acquires the first sensing data for each first region PDA1 (step S405) and generates a heat map by using the first sensing data Hn (step S406).

In the third embodiment, as described above, the threshold Hth in hover detection operation is set and a heat map corresponding to the shape of a user's finger is generated when the first sensing data acquired for the first regions PDA1 on the detection region DA includes the first sensing data equal to or larger than the threshold Hth. In the fourth embodiment, the first sensing data after touch detection is acquired. Accordingly, the first sensing data necessary for heat map generation can be acquired by first sensing data acquisition processing during normal hover detection operation.

The processing circuit 103 executes determination processing of a touch operation target screen in touch detection coordinate acquisition based on the heat map generated in the processing at step S406, and outputs a touch detection position on the touch operation target screen to the HOST 200 based on the result of the determination processing.

Specifically, the processing circuit 103 executes first matching processing on the heat map generated in the processing at step S406 (step S407). Specifically, the processing circuit 103 performs matching between the heat map generated in the processing at step S406 and the first heat map held in advance.

When a match between the maps is determined in the first matching processing (Yes at step S407), the processing circuit 103 determines that an operation in touch detection coordinate acquisition is an operation on a graphical object on the first screen A (step S408), and outputs the touch detection coordinate P acquired during the above-described touch detection operation to the HOST 200 as a position on the first screen A (step S412).

When no match between the maps is determined in the first matching processing (No at step S407), the processing circuit 103 subsequently executes second matching processing on the heat map generated in the processing at step S406 (step S409). Specifically, the processing circuit 103 performs matching between the heat map generated in the processing at step S406 and the second heat map held in advance.

When a match between the maps is determined in the second matching processing (Yes at step S409), the processing circuit 103 determines that an operation in touch detection coordinate acquisition is an operation on a graphical object on the second screen B (step S410), and outputs the touch detection coordinate P acquired during the above-described touch detection operation to the HOST 200 as a position on the second screen B (step S412).

After the processing circuit 103 outputs the touch detection coordinate P on a screen determined to be a touch operation target screen in the above-described determination processing of a touch operation target screen to the HOST 200 (step S412), the processing circuit 103 re-executes the processing starting from step S403.

When no match between the maps is determined in the second matching processing (No at step S409), the processing circuit 103 discards the touch detection coordinate P acquired during the above-described touch detection operation and the heat map generated in the above-described heat map generation processing (step S411), and re-executes the processing starting from step S403.

The display device 1 according to the embodiment has a configuration capable of simultaneously displaying, on the same display region, different graphical objects for viewpoints at two different positions, and can determine an operation target screen in accordance with the viewpoint position of the user by executing processing according to each above-described embodiment. Accordingly, an operation target graphical object on the operation target screen in accordance with the viewpoint position of the user can be identified.

Preferable embodiments of the present disclosure are described above, but the present disclosure is not limited to such embodiments. Contents disclosed in the embodiments are merely exemplary, and various kinds of modifications are possible without departing from the scope of the present disclosure. For example, the above-described processes according to the embodiments may be combined. Any modification performed as appropriate without departing from the scope of the present disclosure belongs to the technical scope of the present disclosure. At least one of various kinds of omission, replacement, and modification of any constituent component may be performed without departing from the scope of the above-described embodiments and modifications.

What is claimed is:

1. A display device comprising:

a display panel including a display region capable of simultaneously displaying a first screen and a second screen, the first screen being visually recognized from a first viewpoint, the second screen being visually recognized from a second viewpoint different from the first viewpoint;

a detection sensor including a detection region overlapping the display region; and a control circuit having a first detection function to detect a physical object that is in proximity to the display panel and a second detection function to detect a touch on a graphical object displayed on an operation target screen that is one of the first and second screens, wherein the control circuit determines the operation target screen based on a movement amount of a coordinate on the detection region acquired by the first detection function, the control circuit acquires, as the movement amount, a difference value between a first coordinate acquired by the first detection function at a first time point and a second coordinate acquired by the first detection function at a second time point later than the first time point, the first screen is a screen visually recognized from the first viewpoint on the right relative to the display region, the second screen is a screen visually recognized from the second viewpoint on the left relative to the display region, and the control circuit calculates the difference value by subtracting the second coordinate from the first coordinate by assuming that a direction from left to right relative to the display region corresponds to a positive value, determines the first screen to be the operation target screen when the difference value is equal to or larger than zero, and determines the second screen to be the operation target screen when the difference value is smaller than zero.

2. A display device comprising:

a display panel including a display region capable of simultaneously displaying a first screen and a second screen, the first screen being visually recognized from a first viewpoint, the second screen being visually recognized from a second viewpoint different from the first viewpoint;

a detection sensor including a detection region overlapping the display region; and a control circuit having a first detection function to detect a physical object that is in proximity to the display panel and a second detection function to detect a touch on a graphical object displayed on an operation target screen that is one of the first and second screens, wherein in the first detection function, the control circuit generates, based on detected values of a plurality of regions acquired by dividing the detection region into the regions, a heat map weighted with the detected values of the regions and determines the operation target screen based on the heat map, the control circuit determines the operation target screen based on a tilt at the barycenter position of the heat map, the first screen is a screen visually recognized from the first viewpoint on the right relative to the display region, the second screen is a screen visually recognized from the second viewpoint on the left relative to the display region, and the control circuit calculates the tilt at the barycenter position of the heat map by assuming that a first direction is a direction extending in a right-left direction relative to the display region, a second direction is a direction orthogonal to the first direction, a direction from bottom to top in the second direction corresponds to 0 degrees, and a direction tilted to the left corresponds to a positive value, determines the first screen to be the operation target screen when the tilt at the barycenter position of the heat map is equal to or larger than 0 degrees, and determines the second screen to be the operation target screen when the tilt at the barycenter position of the heat map is smaller than 0 degrees.

3. A display device comprising:

a display panel including a display region capable of simultaneously displaying a first screen and a second screen, the first screen being visually recognized from a first viewpoint, the second screen being visually recognized from a second viewpoint different from the first viewpoint;

a detection sensor including a detection region overlapping the display region; and a control circuit having a first detection function to detect a physical object that is in proximity to the display panel and a second detection function to detect a touch on a graphical object displayed on an operation target screen that is one of the first and second screens, wherein in the first detection function, the control circuit generates, based on detected values of a plurality of regions acquired by dividing the detection region into the regions, a heat map weighted with the detected values of the regions and determines the operation target screen based on the heat map, and the control circuit holds in advance a first heat map acquired by assuming that the first screen serves as the operation target screen, and a second heat map acquired by assuming that the second screen serves as the operation target screen, executes matching processing between a heat map acquired in a detection period and the first heat map and determines the first screen to be the operation target screen when a match between the maps is determined, and executes matching processing between a heat map acquired in the detection period and the second heat map and determines the second screen to be the operation target screen when a match between the maps is determined.

* * * * *